United States Patent [19]

Hardouin et al.

[11] 4,076,713

[45] Feb. 28, 1978

[54] INDANTHRENE DYES

[75] Inventors: Jean Claude Henri Raoul Hardouin, Chantilly; Maurice René Jean Vallette, Precy sur Oise, both of France

[73] Assignee: Produits Chimiques Ugine Kuhlmann, Paris, France

[21] Appl. No.: 587,018

[22] Filed: Jun. 16, 1975

[30] Foreign Application Priority Data

Jun. 21, 1974 France .................................. 74 21585

[51] Int. Cl.$^2$ ................................................. C09B 5/48
[52] U.S. Cl. .......................................... 260/263; 8/34; 8/40
[58] Field of Search ........................................ 260/263

[56] References Cited

U.S. PATENT DOCUMENTS

| 1,975,248 | 10/1934 | Bishop et al. | 260/263 |
| 2,693,469 | 11/1954 | Thielert et al. | 260/263 |
| 2,764,586 | 9/1956 | Thielert et al. | 260/263 |

FOREIGN PATENT DOCUMENTS

| 992,568 | 5/1965 | United Kingdom | 260/263 |
| 1,323,442 | 7/1973 | United Kingdom | 260/263 |
| 1,375,652 | 11/1974 | United Kingdom | 260/263 |

*Primary Examiner*—Delbert R. Phillips
*Attorney, Agent, or Firm*—Beveridge, Degrandi, Kline, Lunsford

[57] ABSTRACT

A process for the preparation of a vat dye of the dianthraquinone-azine or dianthraquinone-N,N'-dihydroazine series, or a higher cyclic homologue thereof, which comprises reacting a primary amine selected from the group consisting of amino anthraquinones, their substitution products and higher cyclic homologues, with an alkaline condensing agent, wherein reaction is effected in the presence of at least one oxide of an organic derivative of a metalloid element of Group 5B of the Periodic Classification of the elements.

13 Claims, No Drawings

INDANTHRENE DYES

The present invention relates to a process for the preparation of vat dyes of the dianthraquinone-azine or dianthraquinone-N,N'-dihydroazine series and their higher cyclic homologues.

Dianthraquinone azines or dianthraquinone-N,N'-dihydroazines may be prepared from 1-amino or 2-amino anthraquinones, which may be substituted or unsubstituted, or from their derivatives containing a halogen in a suitable position with respect to the amino group.

Industrially, the preparation of indanthrone (unsubstituted dianthraquinone-N,N'-dihydroazine) is effected by fusion at a temperature of 200° C to 250° C of 2-amino-anthraquinone with potassium hydroxide or a mixture of potassium and sodium hydroxides, in the presence of an oxidising agent (see BIOS 987, 4, 52/4; FIAT 1313, 2, 73). But during this fusion, a large part of the 2-amino-anthraquinone is converted, as a result of secondary reactions, into products other than indanthrone, for example, alizarin, 2-hydroxy-anthraquinone, 1-hydroxy-2-amino-anthraquinone and isomers of indanthrone (known by the names of indanthrenes B and C).

Since 1-amino-anthraquinone is a raw material as readily available as 2-amino-anthraquinone and does not lead to the formation of indanthrone isomers, its use for the preparation of indanthrone has been described in several Patent Specifications.

Thus, in German Pat. No. 175,626 of 13th June 1905, and in French Pat. No. 1,051,407 filed on 7th Nov., 1951, the synthesis of indanthrone is effected by fusion of 1-amino-anthraquinone in an alkali metal phenate at a temperature of 200° C to 220° C, in the presence of an oxidising agent and possibly of an alkali metal salt of a lower fatty acid. Since the yields of indanthrone obtained (calculated with respect to 1-amino-anthraquinone reacted) are of the order of 77%, it is evident that a not inconsiderable part of the 1-amino-anthraquinone is converted into secondary products. Moreover, the reaction conditions used in the processes of fusion in the phenate do not allow the substituted derivatives or the higher cyclic homologues of indanthrone to be obtained from the corresponding amines.

According to the French Pat. No. 1,376,198, filed on 3rd Dec., 1963, the dianthraquinone azines or dianthraquinone-N,N'-dihydroazines, as well as their higher cyclic homologues, are prepared by treating the appropriate primary amines with an alkaline condensing agent at a temperature of 80° C to 140° C, in the presence of an organic sulphone or sulphoxide and possibly an oxidising agent. But again by-products such as 1-hydroxy-anthraquinone and alizarin are formed and the recovery of the sulphoxide used is also very difficult, in particular on account of the lack of stability of this type of product, therefore excluding the industrial application of such a process.

Using a similar idea, the German Pat. No. 1,264,648 filed on 30th Nov., 1963, proposes to prepare indanthrone by treating 1-amino or 2-amino anthraquinone with an alkaline condensing agent at a temperature of 80° C to 140° C, in the presence of a tetraalkylurea and possibly of an oxidising agent, but this patent gives no indication for believing that this process leads specifically to indanthrone without formation of secondary products.

It has now been found, according to the present invention, that it is possible to obtain advantageously dyestuffs of the dianthraquinone-azine or dianthraquinone-N,N'-dihydroazine series, as well as their higher cyclic homologues, by reacting the appropriate primary amines with an alkaline condensing agent in the presence of one or more oxides of organic derivatives of the metalloid elements of group 5B of the Periodic Classification of the elements.

Examples of primary amines which may be used in the process of the invention are 1-amino-anthraquinone, 1,4-diamino-, 1,5-diamino- and 1,8-diamino-anthraquinones, as well as their derivatives containing a benzoyl group on one of the amino groups, 1-amino-6-chloroanthraquinone, 1-amino-4-hydroxy-anthraquinone, 1-amino-4-methoxy-anthraquinone, 3-amino-benzanthrone, 16-amino-dibenzanthrone, the monoamino-benzacridones and their chlorinated derivatives.

Alkaline condensing agents which are particularly suitable are the alkali metal hydroxides, such as potassium and sodium hydroxides. They may be employed for example in solid form, in the form of an aqueous solution, or in the form of a solution in an aliphatic alcohol having 1 to 5 carbon atoms.

Examples of oxides of organic derivatives of metalloid elements of Group 5B are oxides of aliphatic and aromatic amines such as trimethylamine oxide and dimethylaniline oxide, oxides of heterocyclic nitrogenous bases such as pyridine-N-oxide, $\alpha$-, $\beta$- $\gamma$-picoline N-oxides, quinoline N-oxide, alkylphosphine- and arylphosphine-oxides such as triphenylphosphine oxide and tri(4-dimethylamino-phenyl)-phosphine oxide, alkylaminophosphine- and alkylarylaminophosphine-oxides such as hexamethylphosphorotriamide, tris-(1-aziridinyl)-phosphine oxide and tris[(2-methyl)-1-aziridinyl]-phosphine oxide, arsine oxides such as triphenylarsine oxide and cacodyl oxide. These oxides may be used as such or in admixture with organic solvents such as pyridine, 2-chloro-pyridine, quinoline, secondary and tertiary alkylanilines, or nitrobenzene.

The temperatures used in the process of the invention are a function of the initial primary amine as well as of the oxide and the solvent used. They are generally from 50° C. to 140° C.

In a number of cases it is advantageous to conduct the reaction in the presence of an oxidising agent which permits the regeneration of the oxide in situ. Such an oxidising agent may be, for example, air or oxygen (used without catalyst or with an oxidation catalyst selected from the compounds of transition metals well known for this purpose, such as for example vanadium pentoxide), a nitrate, a chlorate, or a per-salt such as an alkali metal perborate. However, it is also possible to conduct the reaction in the absence of an oxidising agent, for example under an atmosphere of nitrogen.

In some cases it may also be beneficial to introduce into the reaction medium a wetting agent resistant to the alkali metal hydroxides such as, for example, naphthalene- or alkyl-naphthalene alkali metal sulphonates, and amides of sulphated oleic acid.

The process according to the invention has the advantage compared with earlier processes of leading specifically to dianthraquinone azine or dianthraquinone-N,N'-dihydroazine derivatives (or to their higher cyclic homologues). In fact, less than 10% of the primary amine which has reacted is converted into secondary products. Moreover, the primary amine which has not reacted can be easily recovered (in the form of a product of good technical quality which can be subsequently re-used) from the filtrates resulting from the operations of isolating the dyestuff. These filtrates may be either the mother liquors from vatting, from which the amine is recovered by oxidation in the air and precipitation, or the sulphuric mother liquors (in the case where the dyestuff has been isolated by crystallisation in a sulphuric medium), from which the amine sulphate is recovered by dilution and precipitation.

Further, the oxides of organic derivatives used in the process according to the invention are stable products of which the partial or total recovery is easy. According to the circumstances these oxides may be found at the end of the reaction either unaltered or in a reduced form. The unaltered oxides may be recovered for example by distillation under atmospheric pressure or reduced pressure, or by extraction in a solvent medium and reprecipitation. The reduction products may be recovered for example by extraction in solvent medium, then reconverted into oxides by means of suitable oxidising agents according to known methods. In some cases the reduction products can be separated and recovered during the course itself of the reaction.

The following Examples, in which the parts and percentages are by weight, illustrate the invention without restricting it thereto.

EXAMPLE 1

1 part of ammonium naphthalene sulphonate is dissolved in 125 parts of 50% caustic potash, then 140 parts of hexamethylphosphorotriamide are added. The heterogeneous mixture thus obtained is heated to 125° to 130° C and 31 parts of 1-amino-anthraquinone are rapidly introduced with agitation. While maintaining the temperature and the agitation, a current of air is passed through the reaction mass for 8 hours. During this operation, water which evaporates is returned to the reactor by the use of a reflux condenser. Once the operation is finished the reaction mass is poured into 1000 parts of water. The precipitate obtained is separated by filtration and washed with water until the washings are neutral.

The resultant filter cake is dissolved in 1200 parts of water and 120 parts of 30% caustic soda. The temperature is raised to 60° C and 16 parts of sodium hydrosulphite are added. The temperature is allowed to return to 47°–48° C, which causes the crystallisation of the sodium salt of the leuco derivative of the dianthraquinone-N,N'-dihydroazine. This salt is filtered at this same temperature and oxidized in air, according to known processes, to form a blue vat dye. 25 parts of pure dianthraquinone-N,N'-dihydroazine are thus obtained.

In the mother liquors from vatting, 3 parts of 1-amino-anthraquinone which has not reacted are recovered by oxidation in air, crystallisation, filtration and drying.

The yield of dyestuff, calculated with respect to the 1-amino-anthraquinone reacted, is then of the order of 90%.

EXAMPLE 2

The reaction mass obtained at the end of the reaction in Example 1 is taken up in 150 parts of toluene. The precipitate obtained is separated by filtration and washed with 150 parts of toluene.

The filter cake is treated as in Example 1 and the results obtained are comparable to those of this Example.

The major part of the hexamethylphosphorotriamide used is recovered by distillation of the toluene mother liquors obtained by filtration of the cake.

EXAMPLE 3

The operation is conducted as in Example 1, but the 140 parts of hexamethylphosphorotriamide initially used are replaced by 40 parts of pyridine-N-oxide. The results obtained are identical to those of Example 1.

EXAMPLE 4

The operation is conducted as in Example 1, but the initial 140 parts of hexamethylphosphorotriamide are replaced by 20 parts of pyridine-N-oxide and 50 parts of quinoline. The results obtained are identical with those of Example 1.

EXAMPLE 5

The operation is conducted as in Example 1, but the current of air is replaced during the reaction by a current of pure oxygen. The results obtained are the same as in Example 1.

EXAMPLE 6

The operation is conducted as in Example 1, but is carried out under an atmosphere of nitrogen and not with a stream of air. 8.9 parts of dianthraquinone-N,N'-dihydroazine are obtained and 21 parts of unreacted 1-amino-anthraquinone are recovered. The yield of dyestuff, calculated with respect to the 1-amino-anthraquinone reacted, is then of the order of 90%.

EXAMPLE 7

1 part of sodium alkylnaphthalene sulphonate and 25 parts of triphenylphosphine oxide are added to 125 parts of 50% caustic potash. The heterogeneous mixture thus obtained is heated to 125°–130° C and 11 parts of 1-amino-anthraquinone are introduced with agitation. While maintaining the temperature and the agitation, a brisk stream of air is passed through the reaction mass for 7 to 10 hours. During this operation water which evaporates is returned to the reactor by the use of a reflux condenser. Once the operation is finished the reaction mass is cooled, then taken up in 160 parts of ethyl alcohol. The precipitate obtained is separated by filtration and washed with 160 parts of ethyl alcohol.

The filter cake is treated as in Example 1. 5.7 parts of pure dianthraquinone-N,N'-dihydroazine are thus obtained.

5 parts of unreacted 1-amino-anthraquinone are recovered from the mother liquors from vatting, by oxidation in the air, crystallisation, filtration and drying. The yield of dyestuff, calculated with respect to the 1-amino-anthraquinone reacted is then 95%.

The alcoholic mother liquors from filtration of the cake are diluted with an equal volume of water. The precipitate obtained is filtered and dried. 22 parts of triphenylphosphine oxide are thus recovered.

EXAMPLE 8

The operation is conducted as in Example 1, but the initial 140 parts of hexamethylphosphorotriamide are replaced by 35.5 parts of quinoline-N-oxide or isoquinoline-N-oxide. The yield of dyestuff, calculated with respect to the 1-amino-anthraquinone reacted, is then of the order of 95%.

EXAMPLE 9

30 parts of dimethylaniline N-oxide are added to 115 parts of an aqueous solution containing 41 parts of 100% potassium hydroxide and 27 parts of 100% sodium hydroxide. The heterogeneous mixture thus obtained is heated to 80° C. and 31 parts of 1-amino-anthraquinone are rapidly introduced with agitation. The temperature and the agitation are maintained during 16 hours then the reaction mass is subjected to a steam-distillation in order to recover the dimethylaniline formed. The continuation of the procedure is the same as in Example 1.

Thus 19.5 parts of dianthraquinone-N,N'-dihydroazine are obtained and 9 parts of unreacted 1-amino-anthraquinone are recovered. The yield of dyestuff, calculated with respect to the 1-amino-anthraquinone reacted, is of the order of 90%.

EXAMPLE 10

The operation is conducted as in Example 1, but the 31 parts of 1-amino-anthraquinone are replaced by 33 parts of 1,4-diamino-anthraquinone. Thus is obtained a blue-gray vat dye.

If the hexamethylphosphorotriamide is replaced by pyridine N-oxide, quinoline N-oxide or dimethyl-aniline N-oxide, the same dye is obtained.

EXAMPLE 11

The operation is conducted as in Example 1, but the 31 parts of 1-amino-anthraquinone are replaced by 33 parts of 1-amino-4-benzoylamino-anthraquinone. An olive-green dye is obtained.

We claim:

1. A process for the preparation of a vat dye of the dianthraquinone-azine or dianthraquinone-N,N'-dihydroazine series, or a higher cyclic homologue therof, which consists essentially of reacting a primary amine selected from the group consisting of amino anthraquinones, their substitution products and higher cyclic homologues, with an alkaline condensing agent, wherein the reaction is effected in the presence of at least one oxide of an organic derivative of a metalloid element of group 5B of the periodic classification of the elements and which is selected from the group consisting of an oxide of an aliphatic or aromatic amine, an oxide of a heterocyclic nitrogenous base, alkylphosphine oxide, arylphosphine oxide, alkylaminophosphine oxide, alkylarylaminophosphine oxide and an arsine oxide, and wherein said oxide is present in sufficient quantity for the reaction.

2. A process as set forth in claim 1 wherein the reaction is carried out in the presence of an oxidizing agent.

3. A process as set forth in claim 2 wherein the reaction is carried out in the presence of air or oxygen.

4. A process as set forth in claim 1 wherein the reaction is carried out in the presence of a solvent.

5. A process as set forth in claim 1 wherein the reaction is carried out in the presence of a wetting agent.

6. A process as set forth in claim 1 wherein said oxide is hexamethylphosphorotriamide.

7. A process as set forth in claim 1 wherein said oxide is pyridine-N-oxide.

8. A process as set forth in claim 1 wherein said oxide is quinoline-N-oxide or isoquinoline-N-oxide.

9. A process as set forth in claim 1 wherein said oxide is dimethylaniline-N-oxide.

10. A process as set forth in claim 1 wherein said primary amine is 1-amino-anthraquinone.

11. A process as set forth in claim 1 wherein said alkaline condensing agent is an alkali metal hydroxide.

12. A process as set forth in claim 1 wherein the temperature used in the process is from 50° C to 140° C.

13. The process of claim 1 wherein the molar ratio to oxide to primary amine ranges from 1 to 8.

* * * * *